(12) United States Patent
Yamasaki et al.

(10) Patent No.: US 7,565,656 B2
(45) Date of Patent: Jul. 21, 2009

(54) SYSTEM, METHOD AND PROGRAM FOR ALLOCATING COMPUTER RESOURCES

(75) Inventors: Yasushi Yamasaki, Higashiyamato (JP); Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 995 days.

(21) Appl. No.: 10/894,312

(22) Filed: Jul. 20, 2004

(65) Prior Publication Data

US 2005/0131982 A1 Jun. 16, 2005

(30) Foreign Application Priority Data

Dec. 15, 2003 (JP) ............................. 2003-416474

(51) Int. Cl.
*G06F 9/46* (2006.01)
*G06F 15/173* (2006.01)

(52) U.S. Cl. ...................... 718/104; 718/105; 709/223; 709/224; 709/226

(58) Field of Classification Search ......... 718/104–105, 718/100; 709/223–226
See application file for complete search history.

(56) References Cited

U.S. PATENT DOCUMENTS

| | | | | |
|---|---|---|---|---|
| 5,675,797 A * | 10/1997 | Chung et al. ................ | 718/104 |
| 7,140,020 B2 * | 11/2006 | McCarthy et al. ........... | 718/104 |
| 7,228,351 B2 * | 6/2007 | Arwe ........................... | 709/226 |
| 7,308,687 B2 * | 12/2007 | Trossman et al. ........... | 718/104 |
| 2002/0049841 A1 * | 4/2002 | Johnson et al. ............. | 709/225 |
| 2002/0059427 A1 | 5/2002 | Tamaki et al. | |
| 2002/0143945 A1 | 10/2002 | Shahabuddin et al. | |
| 2003/0036886 A1 * | 2/2003 | Stone .......................... | 702/188 |
| 2003/0093528 A1 * | 5/2003 | Rolia .......................... | 709/226 |
| 2003/0135609 A1 * | 7/2003 | Carlson et al. .............. | 709/224 |
| 2004/0139186 A1 * | 7/2004 | Lee et al. .................... | 709/223 |

(Continued)

FOREIGN PATENT DOCUMENTS

JP 2001-195268 7/2001

(Continued)

OTHER PUBLICATIONS

Case, J. et al, "A Simple Network Management Protocol (SNMP)", Network Working Group, Request for Comments: 1157, pp. 1-36; May 1990. USA.

(Continued)

*Primary Examiner*—Meng-Ai An
*Assistant Examiner*—Jennifer N To
(74) *Attorney, Agent, or Firm*—Antonelli, Terry, Stout & Kraus, LLP.

(57) ABSTRACT

The present invention is capable of automatically changing resource allocation based on a result of measurement of performance information conforming to the service level objective corresponding to various kinds of applications. For the change of resource allocation, in accordance with a generated resource allocation changing rules and the structure information, the present invention comprises: a performance measurement item template to generate a measurement item of the performance information from the structure information by storing a resource table including a server, network, and storage, an application table indicating structural elements of applications operating on these resources, and an allocation table to applications of resources; a performance measurement engine for measuring the measurement item of this performance information with the performance measurement engine; and a means for generating resource allocation changing rules used for resource allocation change from the structure information.

33 Claims, 18 Drawing Sheets

U.S. PATENT DOCUMENTS

2008/0086731 A1 * 4/2008 Trossman et al. ........... 718/100

FOREIGN PATENT DOCUMENTS

| JP | 2003-124985 | 4/2003 |
| --- | --- | --- |
| JP | 2003-131907 | 5/2003 |
| JP | 2003-281007 | 10/2003 |

OTHER PUBLICATIONS

"Web-Based Enterprise Management (*WBEM*) Initiative," *Distributed Management Task Force, Inc.*, pp. 1-2; May 7, 2004, USA.

* cited by examiner

FIG.3

PERFORMANCE MEASUREMENT ITEM TEMPLATE 501

| MEASUREMENT ID | MEASUREMENT ITEM |
|---|---|
| 1 | RESPONSE TIME OF WEB CONTAINER |
| 2 | RESPONSE TIME OF AP CONTAINER |

RESOURCE ALLOCATION CHANGING RULE TEMPLATE 502

| RULE ID | RULE |
|---|---|
| 1 | RESPONSE TIME OF WEB CONTAINER > 1 SECOND ⇒ ADDITION OF ONE UNIT OF WEB CONTAINER |
| 2 | RESPONSE TIME OF AP CONTAINER > 1 SECOND ⇒ ADDITION OF ONE UNIT OF AP CONTAINER |

TEMPLATES FOR THREE-LEVEL APPLICATION

FIG.5

PERFORMANCE MEASUREMENT ITEM TABLE 301

| MEASUREMENT ITEM ID | MEASUREMENT ITEM |
|---|---|
| 1 | RESPONSE TIME OF WEB CONTAINER 103 |
| 2 | RESPONSE TIME OF WEB CONTAINER 104 |
| 3 | RESPONSE TIME OF AP CONTAINER 106 |
| 4 | RESPONSE TIME OF AP CONTAINER 107 |

FIG.6

RESOURCE ALLOCATION CHANGING RULE TABLE 302

| RULE ID | RULE |
|---|---|
| 1 | RESPONSE TIME OF WEB CONTAINER 103 > 1 SECOND ⇒ ADDITION OF WEB CONTAINER |
| 2 | RESPONSE TIME OF WEB CONTAINER 104 > 1 SECOND ⇒ ADDITION OF WEB CONTAINER |
| 3 | RESPONSE TIME OF AP CONTAINER 106 > 1 SECOND ⇒ ADDITION OF AP CONTAINER |
| 4 | RESPONSE TIME OF AP CONTAINER 107 > 1 SECOND ⇒ ADDITION OF AP CONTAINER |

FIG.7A

APPLICATION TABLE　　　　　　　　　　303

| ID | APPLICATION NAME | PARENT APPLICATION |
|---|---|---|
| 1 | THREE-LEVEL APPLICATION 601 | – |
| 2 | WEB APPLICATION 602 | 0 |
| 3 | AP APPLICATION 603 | 0 |
| 4 | DB APPLICATION 604 | 0 |

FIG.7B

RESOURCE TABLE　　304

| ID | RESOURCE NAME |
|---|---|
| 1 | WEB CONTAINER 103 |
| 2 | WEB CONTAINER 104 |
| 3 | WEB CONTAINER 105 |
| 4 | AP CONTAINER 106 |
| 5 | AP CONTAINER 107 |
| 6 | DB SERVER 108 |

FIG.7C

ALLOCATION TABLE　　305

| RESOURCE ID | APPLICATION ID |
|---|---|
| 1 | 2 |
| 2 | 2 |
| 4 | 3 |
| 5 | 3 |
| 6 | 4 |

LIST OF PERFORMANCE MEASUREMENT RESULTS 901

| MEASUREMENT ITEM ID | MEASUREMENT RESULTS |
|---|---|
| 1 | 1.5 |
| 2 | 0.3 |
| 3 | 0.5 |
| 4 | 0.8 |

FIG.10

PERFORMANCE MEASUREMENT ITEM TABLE 306

| MEASUREMENT ITEM ID | MEASUREMENT ITEM |
|---|---|
| 1 | RESPONSE TIME OF WEB CONTAINER 103 |
| 2 | RESPONSE TIME OF WEB CONTAINER 104 |
| 3 | RESPONSE TIME OF AP CONTAINER 106 |
| 4 | RESPONSE TIME OF AP CONTAINER 107 |
| 5 | RESPONSE TIME OF WEB CONTAINER 105 |

FIG.11

RESOURCE ALLOCATION CHANGING RULE TABLE 307

| RULE ID | RULE |
|---|---|
| 1 | RESPONSE TIME OF WEB CONTAINER 103 > 1 SECOND ⇒ ADDITION OF WEB CONTAINER |
| 2 | RESPONSE TIME OF WEB CONTAINER 104 > 1 SECOND ⇒ ADDITION OF WEB CONTAINER |
| 3 | RESPONSE TIME OF AP CONTAINER 106 > 1 SECOND ⇒ ADDITION OF AP CONTAINER |
| 4 | RESPONSE TIME OF AP CONTAINER 107 > 1 SECOND ⇒ ADDITION OF AP CONTAINER |
| 5 | RESPONSE TIME OF WEB CONTAINER 105 > 1 SECOND ⇒ ADDITION OF WEB CONTAINER |

FIG.12A

APPLICATION TABLE 303

| ID | APPLICATION NAME | PARENT APPLICATION |
|---|---|---|
| 1 | THREE-LEVEL APPLICATION 601 | — |
| 2 | WEB APPLICATION 602 | 0 |
| 3 | AP APPLICATION 603 | 0 |
| 4 | DB APPLICATION 604 | 0 |

FIG.12B

RESOURCE TABLE 304

| ID | RESOURCE NAME |
|---|---|
| 1 | WEB CONTAINER 103 |
| 2 | WEB CONTAINER 104 |
| 3 | WEB CONTAINER 105 |
| 4 | AP CONTAINER 106 |
| 5 | AP CONTAINER 107 |
| 6 | DB SERVER 108 |

FIG.12C

ALLOCATION TABLE 308

| RESOURCE ID | APPLICATION ID |
|---|---|
| 1 | 2 |
| 2 | 2 |
| 4 | 3 |
| 5 | 3 |
| 6 | 4 |
| 3 | 2 |

FIG.14

| PERFORMANCE MEASUREMENT ITEM TEMPLATE | 503 |
|---|---|
| MEASUREMENT ITEM ID | MEASUREMENT ITEM |
| 1 | CPU USING RATE OF DB SERVER |
| 2 | VACANT CAPACITY OF LOGICAL VOLUME |

| RESOURCE ALLOCATION CHANGING RULE TEMPLATE | 504 |
|---|---|
| RULE ID | RULE |
| 1 | VACANT CAPACITY OF LOGICAL VOLUME < 1 GB ⇒LOGICAL VOLUME SIZE IS INCREASED BY 100 GB |
| 2 | CPU USING RATE OF DB SERVER > 90% ⇒ADDITION OF DB SERVER |

DBMS STORAGE INCORPORATED TEMPLATE

FIG.16

PERFORMANCE MEASUREMENT ITEM TABLE　　309

| MEASUREMENT ITEM ID | MEASUREMENT ITEM |
|---|---|
| 1 | CPU USING RATE OF DB SERVER 109 |
| 2 | CPU USING RATE OF DB SERVER 110 |
| 3 | VACANT CAPACITY OF VIRTUAL STORAGE 111 |

FIG.17

RESOURCE ALLOCATION CHANGING RULE TABLE　　310

| RULE ID | RULE |
|---|---|
| 1 | VACANT CAPACITY OF LOGICAL VOLUME OF VIRTUAL STORAGE 111 < 1GB ⇒INCREASE OF 100GB IN THE LOGICAL VOLUME SIZE |
| 2 | CPU USING RATE OF DB SERVER 109 > 90%⇒ADDITION OF DB SERVER |
| 3 | CPU USING RATE OF DB SERVER 110 > 90%⇒ADDITION OF DB SERVER |

FIG.18A

APPLICATION TABLE 311

| ID | APPLICATION NAME | PARENT APPLICATION |
|---|---|---|
| 1 | DBMS STORAGE INCORPORATED APPLICATION 605 | – |
| 2 | DB APPLICATION 606 | 0 |
| 3 | VIRTUAL STORAGE APPLICATION 607 | 1 |

FIG.18B

RESOURCE TABLE 312

| ID | RESOURCE NAME | SPECIFICATION |
|---|---|---|
| 1 | DB SERVER 109 | – |
| 2 | DB SERVER 110 | – |
| 3 | VIRTUAL STORAGE 111 | 1 TB IN MAXIMUM |

FIG.18C

ALLOCATION TABLE 313

| RESOURCE ID | APPLICATION ID | ALLOCATION RATE |
|---|---|---|
| 1 | 2 | 100% |
| 2 | 2 | 100% |
| 3 | 3 | 50% |

FIG.19

LIST OF PERFORMANCE MEASUREMENT RESULTS  902

| MEASUREMENT ITEM ID | MEASUREMENT RESULTS |
|---|---|
| 1 | 50% |
| 2 | 60% |
| 3 | 500MB |

FIG.21A

APPLICATION TABLE 311

| ID | APPLICATION NAME | PARENT APPLICATION |
|---|---|---|
| 1 | DBMS STORAGE INCORPORATED APPLICATION | – |
| 2 | DB APPLICATION | 0 |
| 3 | VIRTUAL STORAGE APPLICATION | 1 |

FIG.21B

RESOURCE TABLE 312

| ID | RESOURCE NAME | SPECIFICATION |
|---|---|---|
| 1 | DB SERVER 109 | – |
| 2 | DB SERVER 110 | – |
| 3 | VIRTUAL STORAGE 111 | 1 TB IN MAXIMUM |

FIG.21C

ALLOCATION TABLE 314

| RESOURCE ID | APPLICATION ID | ALLOCATION RATE |
|---|---|---|
| 1 | 2 | 100% |
| 2 | 2 | 100% |
| 3 | 3 | 60% |

SYSTEM, METHOD AND PROGRAM FOR ALLOCATING COMPUTER RESOURCES

CLAIM OF PRIORITY

The present application claims priority from Japanese application JP 2003-416474 filed on Dec. 15, 2003, the content of which is hereby incorporated by reference into this application.

FIELD OF THE INVENTION

The present invention relates to the technology for automatically allocating computer resources to applications in order to realize stable operations of the applications.

BACKGROUND OF THE INVENTION

The online systems on the Internet and the intra-office systems are formed of many applications operating on the computers. These applications are sometimes executed in direct on the computers and are also executed on the interpreter programs operating on the computers. The applications include various jobs such as the online job and batch job and these jobs are respectively realized with programs which have been designed and installed in accordance with the inherent format of applications and then operated.

Although the applications are installed and operated in various profiles as described above, operation environments of applications may be divided into the application and the system resource for operation thereof. Particularly, the latter is called a hosting environment. Many company offices issue the order to form the hosting environment and maintenance jog thereof as the out-sourcing to external offices in view of saving the maintenance and management cost of the system foundation of the computers for operating the applications and the network for connecting the computers. The out-sourcing order is destined to a service provider which is called the data center. The data center can provide the hosting environments such as computers and network connections for operating the applications. For example, the out-sourcing of the system foundation of the company home page corresponds to utilization of such hosting environments.

Moreover, the application itself operating on the foundation such as computers is also often ordered for the out-sourcing to the service office called the application service provider (ASP) for the purpose of reduction in the maintenance cost. For example, the out-sourcing of management and maintenance job of the mail server is the suitable example.

The applications are often realized generally on a plurality of computers distributed in the network established even in the online system or the intra-office system and are configured in the complicated formats. In order to stably operate the system to realize a business application consisting of a plurality of format elements, it is required to detect defective part in the format elements of system, namely to always monitor and analyze the application to find out existence of bottleneck or fault. As described above, the application format is considerably complicated and therefore it is difficult to manually monitor the entire part of application and take an appropriate measure for the problem. Accordingly, various attempts have been conducted to realize automated processes.

Remote monitoring of system resources such as networks and server computers is generally conducted and therefore it is possible to detect generation of failure and trouble by remotely monitoring various system resources through the standardized protocol such as SNMP (Simple Network Management Protocol) disclosed in the non-patent document 1. In addition, the specifications for management of system resources based on Web sites are also established like the WBEM (Web Based Enterprise Management) disclosed in the non-patent document 2. For these documents, easier operation management is the key point.

For the existing system, a system manager has manually conducted the jobs such as alteration in the system configuration and replacement of apparatuses in which a fault is generated based on the monitoring information obtained with the SNMP or the like. In view of supporting the jobs to be executed manually, it is analyzed, based on the measured performance information, where a problem or performance bottleneck exists in the system elements. The result obtained is used for alteration of the system configuration. Accordingly, following effects can be attained. Namely, a load of the system manager may be alleviated and system operation and management cost may also be lowered. For analysis of such bottleneck, a system has been known, in which the information on the performance including the bottleneck is measured by sharing a load to the computers for measuring performance through virtual realization of a plurality of clients connected to the Web system 30 to be subjected to the performance evaluation and the information on the performance of the working Web system and the information on the bottleneck are evaluated. (Patent document 1)

A contract regarding service quality which is agreed between a company which conducts out-sourcing and a company which provides services of the data center is considered as an index of the automated processes covering all processes up to alteration of system configuration from measurement of performance information. This contract is generally called a service level agreement (SLA) and is required, in the data center, to maintain the service level conforming to the service level agreement.

As the prior arts for automatically maintaining such service level, various examples are known. In one example of method (Patent Document 2), amount of calculation resources is automatically increased or decreased in comparison with the service level agreement for each user identifier based on the result of monitoring of the operating conditions of the computer. In another example of method (Patent Document 3), resources of the common server are allocated for the clients in accordance with the pattern of use of clients. In the other example of method (Patent Document 4), the maximum resources to be allocated to the application is determined in accordance with the service level, the resource allocation coefficient is also determined in accordance with user service level, and thereby amount of resources of each resource to be allocated to the application is determined with product of these maximum resources and resource allocation coefficient.

For the automatic operation and management of system based on the actual service level agreement including these examples of method, a method is known, in which a practical index which is called the service level objective (SLO) is set and a feedback system which attains such index is established. Moreover, the service level agreement is often agreed by designating the practical service level objective.

[Patent Document 1] JP-A No. 131907/2003
[Patent Document 2] U.S. 2002/0059427A1
[Patent Document 3] U.S. 2002/0143945A1
[Patent Document 4] JP-A No. 195268/2001
[Non-Patent Document 1] SNMP Specifications (RFC1157), Issued by IETF, "Searched on Nov. 18, 2003"
Internet: ietf.org/rfc/rfc1157.txt

[Non-Patent Document 2] WBEM Specifications, Issued by DMTF, "Searched on Nov. 18, 2003"
Internet: dmtf.org/standards/wbem However, in order to realize automated allocation process of the resources by limiting kinds of the applications in the prior art, the resource allocation changing rule based on the item of performance information to be measured and the result of measurement must be previously embedded in the measurement program or in the resource allocation changing program.

In other words, since the measurement of performance information and the analysis for bottleneck based on the result of measurement are carried out depending on the inherent structure of the application, allocation of resources corresponding to the application of a novel kind can be realized by solving the problems that the performance information measurement items and the resource allocation changing rule must be newly installed for the performance information measuring program and resource allocation changing program and the measurement items and changing rule described above must be generated for each execution of a new application.

Moreover, the actual service level objective is often expressed as a physical index which is considered as the index having a comparatively higher degree of abstraction such as a response time in the online application. Accordingly, the application which is generally formed of a plurality of elements will also result in the problem that the service level objective cannot be maintained if the application is not expressed with a more practical performance index such as the response time of each structural element.

SUMMARY OF THE INVENTION

The present invention has been proposed considering the problems described above and therefore an object of the present invention is to perform the measurement of the performance information based on the service level objective and to automatically change the allocation of resources based on the result of measurement of the performance information.

According to one aspect of the present invention, a measurement item generating means for storing, in a structure management means, structure information on resource group including a server, network, and storage and structure information on applications operating on the resources and the information for allocating the resources to the application in order to generate measurement items of the performance information from such structure information, a performance measurement means for measuring the measurement items of the generated performance information with a performance measurement engine, and a means for generating a resource allocation changing rule to be used for allocation change of resources from the structure information stored in the structure management engine are comprised, and moreover allocation of resources is changed in accordance with the resource allocation changing rule generated and the structure information.

According to another aspect of the present invention, a means for describing the inherent structure of application corresponding to kinds of various applications is further comprised and the measurement items of the performance information and the resource allocation changing rule are generated in accordance with the structure of application described above.

According to the other aspect of the present invention, the measurement items and the resource allocation changing rule are generated by disassembling the service level objective having a higher abstraction degree to the service level objective having a lower abstraction degree.

Accordingly, the present invention is capable of automatically allocating adequate resources to the resource which is the bottleneck in the system in accordance with the measurement result of the performance information and is also realizing the stable operation of the applications by satisfying the service level required for the system (resources) through reduction in labor of managers.

BRIEF DESCRIPTION OF THE DRAWINGS

FIG. 3 is an explanatory diagram illustrating contents of a performance measurement item template and a resource allocation changing rule template.

FIG. 5 is an explanatory diagram illustrating a performance measurement item table in the initial allocation.

FIG. 6 is an explanatory diagram illustrating a resource allocation changing rule table in the initial allocation.

FIG. 7A is an explanatory diagram illustrating contents of an application table in structure information on the structure management engine in the initial allocation.

FIG. 7B is an explanatory diagram illustrating contents of a resource table in the structure information.

FIG. 7C is an explanatory diagram illustrating contents of an allocation table in the structure information.

FIG. 10 is an explanatory diagram illustrating contents of the performance measurement item table after the change of resource allocation.

FIG. 11 is an explanatory diagram illustrating contents of the resource allocation changing rule table after the change of resource allocation.

FIG. 12A is an explanatory diagram illustrating contents of the application table in the structure information on the structure management engine after the change of resource allocation.

FIG. 12B is an explanatory diagram illustrating contents of the resource table in the structure information.

FIG. 12C is an explanatory diagram illustrating contents of the allocation table in the structure information.

FIG. 14 is an explanatory diagram illustrating contents of the performance measurement item template and the resource allocation changing rule template of the second embodiment.

FIG. 16 is an explanatory diagram illustrating the performance measurement item table in the initial allocation of the second embodiment.

FIG. 17 is an explanatory diagram illustrating the resource allocation changing rule table in the initial allocation of the second embodiment.

FIG. 18A is an explanatory diagram illustrating contents of the application table of the structure information in the structure management engine in the initial allocation of the second embodiment.

FIG. 18B is an explanatory diagram illustrating contents of the resource table of the structure information of the second embodiment.

FIG. 18C is an explanatory diagram illustrating contents of the allocation table of the structure information of the second embodiment.

FIG. 19 is an explanatory diagram illustrating a list of the performance measurement results of the second embodiment.

FIG. 21A is an explanatory diagram illustrating contents of the application table of the structure information on the structure management engine after the change of resource allocation of the second embodiment.

FIG. 21B is an explanatory diagram illustrating contents of the resource table of the structure information of the second embodiment.

FIG. 21C is an explanatory diagram illustrating contents of the allocation table of the structure information of the second embodiment.

DETAILED DESCRIPTION OF THE PREFERRED EMBODIMENTS

A preferred embodiment of the present invention will be described with reference to the accompanying drawings.

Figure 1:
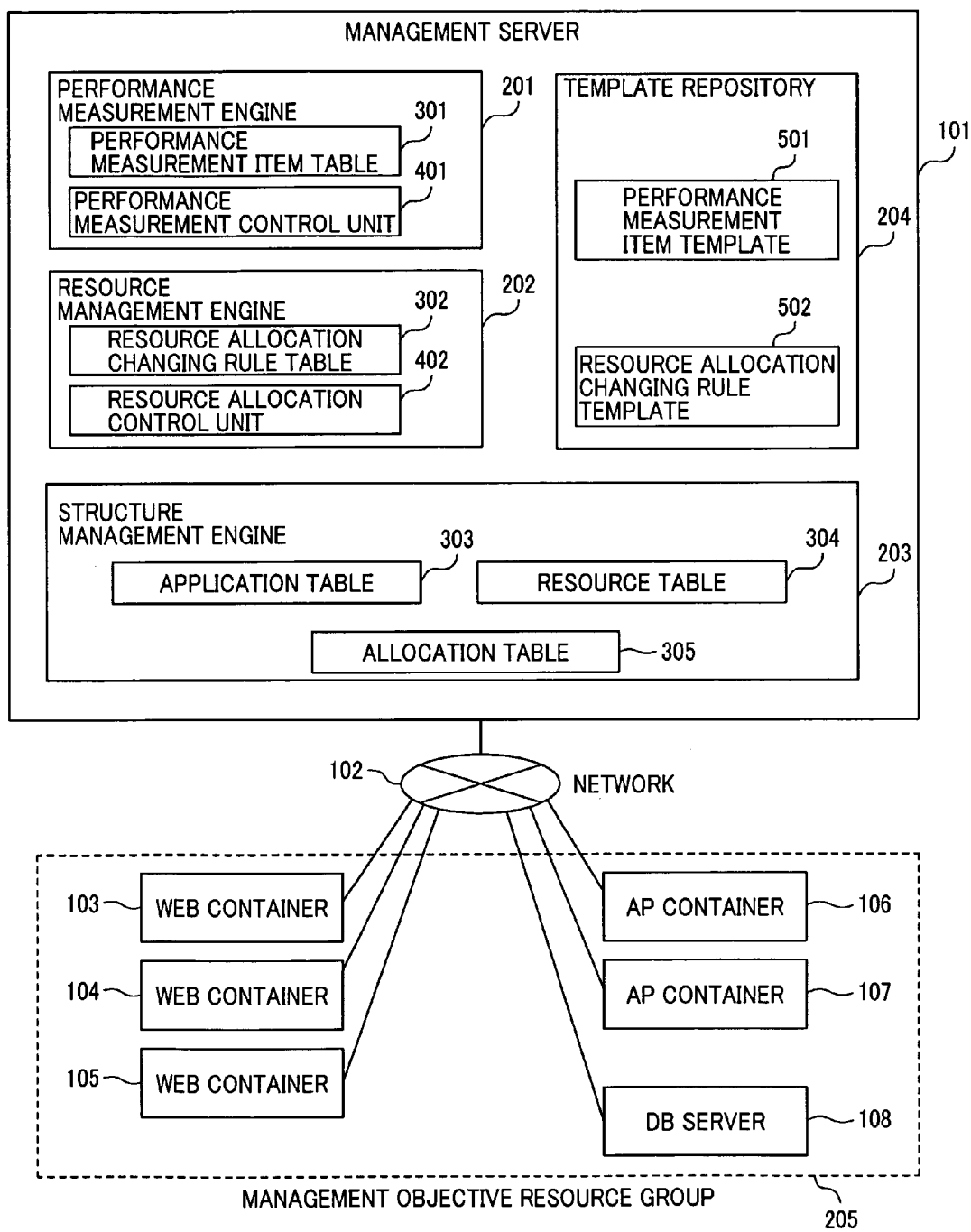
FIG. 1 is a structural diagram illustrating the total structure of a system as a first embodiment.

FIG. 1 is a structural diagram of a system illustrating an example of the preferred embodiments of the present invention. As illustrated in this figure, in an example of the resource allocation system, a management server 101 monitors a three-level Web application system (management objective resource group 205) consisting of three levels of Web containers 103 to 105, AP (application, also in the following) containers 106, 107, and DB server 108 and automatically performs process to add the Web containers when the operating condition of the Web containers enters a predetermined condition (for example, the response time becomes one second or longer).

A management server 101 is a server computer, on which the resource allocation system of the present invention is operating, provided with a CPU, a memory, and a storage, although not illustrated. On the management server 101, a performance measurement engine 201 forming the resource allocation system, a resource management engine 202, a structure management engine 203, and a template repository 204 are operating.

In FIG. 1, as an example, each component of the engines 201 to 204 is operating on the same management server 101. However, each component is capable of operating independently on a plurality of management servers. In addition, a plurality of engines may also be provided and these engines are allowed to cooperate with each other for the operations thereof on the network.

The Web containers 103 to 105, AP containers 106, 107, and DB server 108 are connected to the management server 101 via the network. The network connection to realize the three-level Web application function may be identical to or may be different from the network 102. However, in this embodiment, it should be noted that the identical network 102 is used as the common network.

In the Web containers 103 to 105, the applications are executed for providing respective Web services. In the AP (application) containers 106 and 107, the application to request the data to the DB (database) container 108 in response to the request from the Web containers 103 to 105 is executed. For example, EJB (Enterprise Java (registered trademark) Beans) and CGI are considered as the examples of such application. Moreover, in the DB container 108, the database application is executed to search the data from the database in response to the request from the AP containers 106, 107.

As the network 102, a small-scale network such as a local area network within company offices may be used and a large-scale network such as the Internet may also be used.

The performance measurement engine 201 forming the resource allocation system generates a performance measurement item table 301 (refer to FIG. 5) and also includes a performance measurement control unit 401 as will be described later. The performance measurement item table 301 stores a list of the measurement items of the performance information on a management objective resource group 205 and the performance measurement control unit 401 conducts performance measurement of each container (component) forming the management objective resource group 205 in accordance with the performance measurement item table 301. The actual performance measurement process may be conducted by the performance measurement engine 201 itself or by the other performance measurement program. In this embodiment, the performance measurement program is respectively executed in each container and the measurement results are obtained with the performance measurement engine 201.

The resource management engine 202 stores a resource allocation changing rule table 302 (refer to FIG. 6) regarding the management objective resource group 205 and includes a resource allocation control unit 402. In this resource allocation changing rule table 302, a resource allocation changing rule for changing the resource allocation in accordance with the measurement result of the performance information on the management objective resource group 205 is stored as the detail changing rule for each resource and the rule is executed and processed with the resource management control unit 402.

In FIG. 6, the rules (conditions) for changing resource allocation of the three-level Web application are set respectively to the resource allocation changing rule table 302 in accordance with the operating conditions of the designated resources (containers) corresponding to the rule ID. For example, the condition for changing the resource allocation that one Web container is added to the three-level Web application when the response time of the Web container 103 has exceeded one second is set to the rule ID=1.

The structure management engine 203 stores three tables of the allocation table 305 including the allocation information between the application table 303 of FIG. 7A, resource table 304 of FIG. 7B, applications of FIG. 7C and the resources.

The application table 303 stores, as illustrated in FIG. 7A, the structure information on the applications to be executed by the management objective resource group 205 in the form of hierarchical structure of structure elements. For example, in the application ID=1, the three-level Web application indicating the entire part of application is set as the application name, while blank is set as the parent application indicating the relationship between parent and child. That is, the three-level Web application is set as the highest priority application.

In the application ID=2, the Web application is set as the application name. In the column of the parent application of the application ID, application ID=0 is set. The similar settings as described above are performed for the other application ID.

Next, the resource table 304 stores, as illustrated in FIG. 7B, relationship between the resource ID of the system resource and the resource name.

Namely, names of all containers forming the management objective resource group 205 are set respectively for each resource ID. In the resource ID=1 to 3, the Web containers 103 to 105 are set. In the resource ID=4, 5, the AP containers 106, 107 are set. In the resource ID=6, the DB server 108 is set. In the resource table 304, all components forming the management objective resource group 205 are described.

The allocation table 305 illustrated in FIG. 7C suggests the correspondence between an application and a resource to be allocated thereto. Namely, this allocation table 305 stores the relationship between the resource IDs in the resource table 304 of FIG. 7B and the application IDs in the application table 303 of FIG. 7A. For example, since the application ID=2 is allocated to the resource ID=1, the resource table 304 and application table 303 suggest that the Web container 103 of resource ID=1 executes the Web application of application ID =2.

Moreover, the template repository 204 stores the performance measurement item template 502 for three-level Web application and the resource allocation template 502. Contents of the template repository 204 are illustrated in FIG. 3. The template repository 204 is an engine for storing a set of the performance measurement item list (template 501) to be used for the performance measurement engine 201 and resource management engine 202 and the template information on the resource allocation changing rule (template 502) and previously stores a set of templates for each kind of the application. Since the three-level applications are assumed in this embodiment, this template repository 204 stores the template which is set to satisfy the service level objective for indicating the performance of the resources as a whole required for the three-level applications.

First, in the performance measurement item template 501, the items of performances to be measured are defined for each kind of containers in order to clarify the performance to be measured regarding the containers (components) of the management objective resource group 205 for execution of the three-level applications. For example, in the measurement item ID=1 of the performance measurement item template 501, it is defined that the measurement objective is the Web container and the content of measurement is the response time. In the measurement item ID=2, it is defined that the measurement objective is the AP container and the content of measurement is the response time. Since only one DB server is provided within the management objective resource group 205, it does not become the objective for change of resource allocation in this embodiment. When a plurality of DB servers are used, it is enough to generate, to the performance measurement item template 501, the measurement item ID defining the DB server as the objective of measurement.

Next, to the resource allocation changing rule template 502 for regulating the resource allocation changing rule in the template repository 204, the condition for changing the resource allocation is set, as illustrated in FIG. 3, corresponding to the measurement item ID defined in the performance measurement item template 501.

For example, in FIG. 3, the resource allocation changing condition that one Web container is added when the response time of the Web container has exceeded one second is defined in the measurement item ID=1 of the performance measurement item template 501 corresponding to the rule ID=1. Similarly, the changing condition that one AP container is added when the response time of the AP container corresponding to the measurement item ID=2 of the performance measurement item template 501 has exceeded one second is defined in the measurement item ID=2.

As described above, the measurement item of performance of each container required to satisfy the performance required for the three-level applications, a threshold value of the performance for maintaining the performance, and resource changing condition when the performance has exceeded the threshold value are set to the template repository 204 as described above. In this embodiment, an example that the resource is added when the performance is lowered (when the response time has exceeded one second) has been described. However, when the performance becomes excessive (for example, the response time becomes 0.3 second or less), it is also possible to set to reduce the number of containers. In addition, the templates 501, 502 are generated when the application designer or manager is trying to operate an application of a novel kind.

Next, contents of each table in the initial allocating condition will be described.

Figure 4:
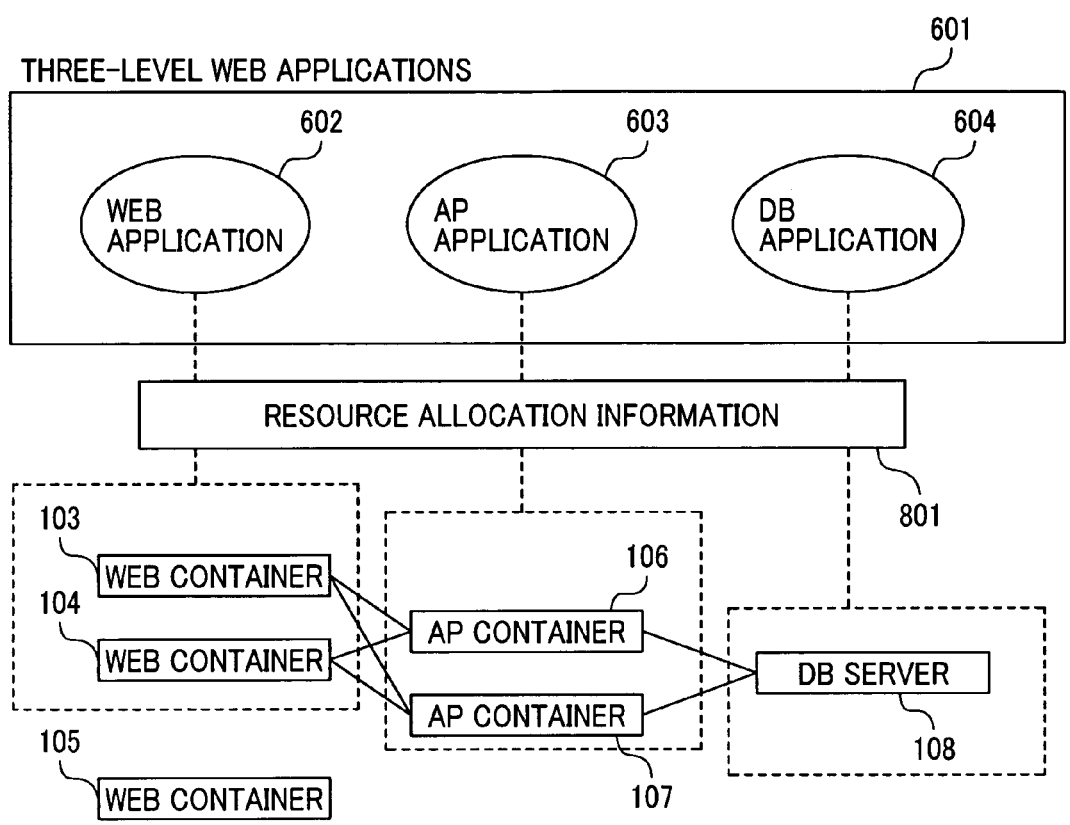
FIG. 4 is an explanatory diagram illustrating structure information on applications and resources in the initial allocating condition.

FIG. 4 is an explanatory diagram illustrating the allocating condition to the application of the resource in the initial condition. A three-level Web application 601 is hierarchically formed with a Web application 602 executed by each container 103 to 108 forming the management objective resource group 205 of FIG. 1, an AP application 603, and a DB application 604. This application structure information is included in the application table 303 of FIG. 7A described above and the respective columns of the application table 303 include the ID of application, application name, and ID of application as the parent of such application.

As indicated in the resource allocation information 801 of FIG. 4, the Web containers 103, 104, AP containers 106, 107, and the resource of DB server 108 are respectively allocated to the Web application 602, AP application 603, and DB application 604. All the resources in the system are described in the resource table 304 of FIG. 7B including the resource IDs and resource names. The Web container 105 in the outside of the frames indicated with the broken lines is not allocated to the three-level applications and is placed to the waiting condition. Contents of the resource allocation information 801 are stored in the allocation table 305 of FIG. 7C. The respective columns include the resource ID and application ID, indicating the relationship between the allocated resource ID and application ID.

In the initial condition of FIG. 4, the templates 501, 502 of FIG. 3, the performance measurement item table 301 of FIG. 5 conforming to the structure information of FIGS. 7A to 7C, and the resource allocation changing rule table 302 of FIG. 6 are generated.

Next, a flow of the processes for changing the resource allocation based on the performance information will be described with reference to FIG. 2.

First, the performance measurement engine 201 transmits a performance measurement item template request 701 to the template repository 204. As a result, the template repository 204 returns, to the performance measurement engine 201, the performance measurement item template 501 with a performance measurement item template response 702.

Next, the performance measurement engine 201 transmits a structure information request 703 to the structure management engine 203 in order to obtain the present structure information. As a result, the structure management engine 203 returns, to the performance measurement engine 201, the requested structure information, namely the application table 303, resource table 304, and allocation table 305 with a structure information response 704.

Next, the performance measurement control unit 401 within the performance measurement engine 201 generates a practical performance measurement item table 301 illustrated in FIG. 6 in accordance with the received performance measurement item template 501 and the structure information.

Since the performance measurement item corresponding to the structure information on application is described to the performance measurement item template 501, the performance measurement control unit 401 converts this performance measurement item to the performance measurement item corresponding to the resource allocated and then generates the performance measurement item table 301 illustrated in FIG. 5.

That is, the performance measurement engine 201 determines which performance information should be measured from which component of the management objective resource group 205 from the measurement item ID and measurement item described in the performance measurement item template 501 obtained from the template repository 204. Moreover, the performance measurement engine 201 also selects the component based on above determination from the resource table 304 to generate the performance measurement item table 301 from the resource indicated by the allocation table 305 indicating the relationship between the present application in the operating condition and the resources.

For example, since the measurement objective is the Web container and the measurement content is response time from the measurement item ID=1 of the performance measurement item template 501, the objective Web container is selected from the resource table 304 in accordance with the resource ID of the present allocation table 305. As a result, the present Web containers 103, 104 of the resource ID=1, 2 in the operating condition are selected and are then described in the measurement item ID=1, 2 of the performance measurement item table 301.

Next, the performance measurement engine 201 transmits a message 705 for instructing measurement of the generated performance measurement item table 301 to the performance measurement program operating respectively in each container of the management objective resource group 205 and also receives a performance measurement result 706. The performance measurement engine 201 transfers the received performance measurement result 706 to the resource management engine 202.

Next, the resource management engine 202 transmits a resource allocation changing rule template request 708 to the template repository 204 and receives, as a result, the resource allocation changing rule template 502 with a resource allocation changing rule template response 709.

The resource allocation changing rule template 502 is formed by describing the rules to change the allocation of resources in accordance with the measured performance information and then converting such rules to that corresponding to the practical resources as described above.

The template repository 204 previously generates details of the rules so that the measurement contents of the measurement item ID being set to the performance measurement item template 501 satisfy the total performance when the total performance of the three-level Web application 601 to be executed with each container of the management objective resource group 205 is given.

Next, the resource management engine 202 transmits a structure information request 710 to the structure management engine 203. As a result, the structure management engine 203 returns the requested structure information, namely the application table 303, resource table 304, and allocation table 305 to the resource management engine 202 with a structure information response 711. The resource allocation control unit 401 within the resource management engine 202 generates the resource allocation changing rule table 302 in accordance with the structure information obtained and the resource allocation changing rule template 502.

Figures 8, 9:
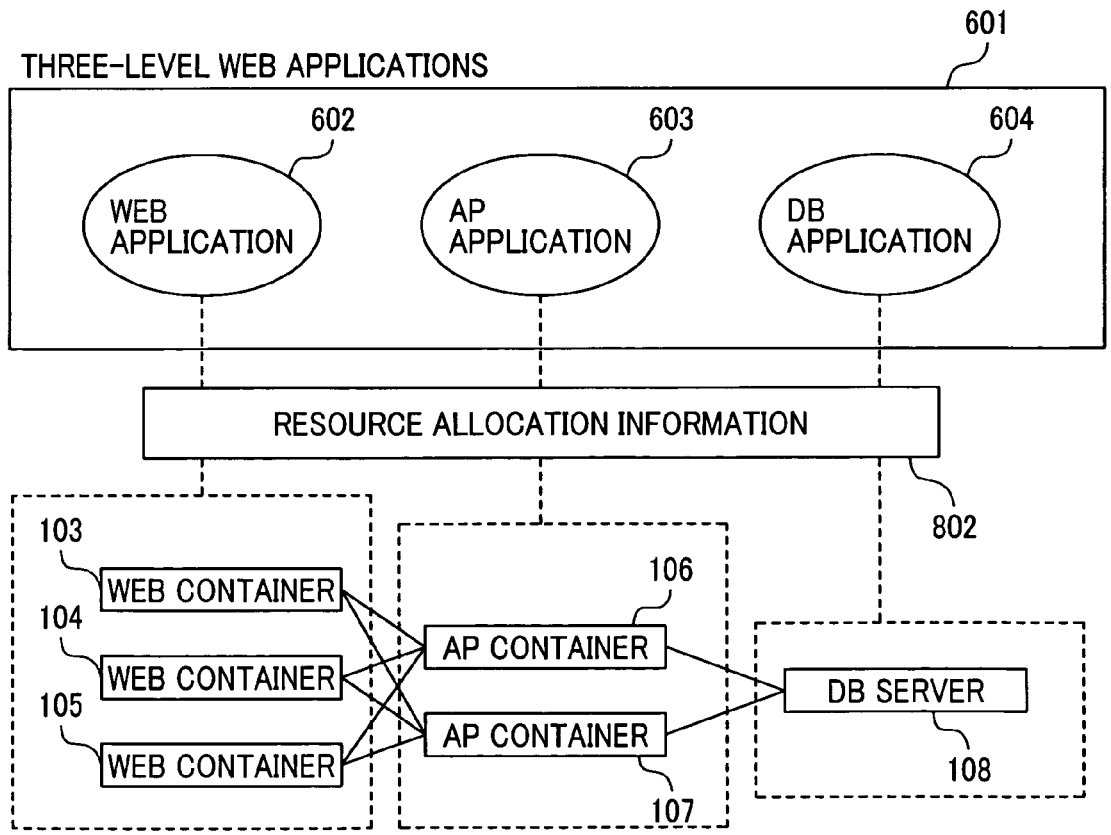
FIG. 8 is an explanatory diagram illustrating a list of the performance measurement results.
FIG. 9 is an explanatory diagram illustrating the structure information on applications and resources after the change of resource allocation.

Here, the condition where the Web container 103 of the resource ID=1 as the result of performance measurement has exceeded the threshold value as illustrated in FIG. 8 in this embodiment will be described. The rule of the rule ID=1 among the resource allocation changing rules of FIG. 6 is executed.

Accordingly, the resource allocation control unit 402 requests the process to add the Web container as the allocation change 712 to the structure management engine 203. The structure management engine 203 selects, upon reception of the request, the Web container 105 to which the application is not allocated from the resource table 304 of FIG. 7B and the allocation table 305 of FIG. 7C and adds the resource by allocating the Web application 602 of the application ID=2 to this Web container 105 and then executes the allocation change (713).

FIG. 9 is a schematic diagram illustrating allocation of application to the resources after the change of allocation. The Web container 105 is newly set corresponding to the Web application 602 with the resource allocation information 802. The structure information within the structure management engine 203 is illustrated in FIGS. 12A to 12C. Contents of the resource allocation information 802 are expressed in the allocation table 308 of FIG. 12C. The last line of the allocation table 308 of FIG. 12C indicates the newly added allocation. Moreover, because of the change of resource allocation, the performance measurement item table 306 during execution of the next sequence of FIG. 2 and the resource allocation change rule table 307 are newly generated respectively from the template as illustrated in FIG. 10 and FIG. 11. The newly generated tables are used for the next process to realize correspondence to the changed resource allocation.

The application can always be operated in accordance with the contents described in the performance measurement item template 501 and resource allocation changing rule template 502 by repeating the sequence as described above.

Accordingly, the performance information can be measured based on the service level objective in accordance with a kind of various applications and moreover the resource allocation may be changed automatically based on the result of measurement of performance information by previously setting the performance measurement item template 501 and resource allocation changing rule template 502 to the values satisfying the objective of service level. Particularly, since the performance measurement item template 501 and resource allocation changing rule template 502 for satisfying the performance of the system as a whole are provided to the template repository 204, the adequate resource may be allocated automatically to the resources as the bottleneck of system. Therefore, the stable operation of the application may be realized by satisfying the service level, while the labor of manager can be reduced.

Moreover, when kind of application may be added for enhancing availability without any change of the system by generating the templates 501, 502 and resource allocation changing rule table 302 in accordance with the application.

In addition, the resource allocation for attaining the service level objective can be automatically realized in accordance with the result of analysis by analyzing and generating the resource allocation changing rule 502 to be used for the change of resource allocation from the structure information being stored in the structure management engine 203 and then changing the resource allocation in accordance with the generated resource allocation changing rule 502 and structure information.

For addition of the kinds of new applications, the application table 303 to describe the inherent structure of application and the template repository 204 for generating the measurement item of the performance information (measurement item template 501) and the resource allocation changing rule (resource allocation changing rule template 502) are provided. Accordingly, a frame for automatically generating the measurement item and resource allocation changing rule can be provided in accordance with the kind of application and thereby the application of a new kind can be used flexibly.

When the present invention described above is adapted to the intra-office resource allocation system, this intra-office system becomes a large-scale system because the intra-office system is formed of a system to process daily batch jobs such as various application processes and calculation of wage and each online system. Therefore, the effective use of these system resources for job processes is an important problem. Moreover, introduction of the resource allocation system of the present invention enables the total management of the resources to be allocated to the systems of various kinds of applications in the intra-office system and also realizes reduction in cost.

In other words, when the system of the present invention is adapted to the resource allocation system in the data center, the system resources in the data center must be allocated corresponding to various kinds of applications at the data center considered as the out-sourcing office. The present invention enables automatic resource allocation job, which will bring out reduction in the running cost at the data center.

In above description, three structural examples of the Web containers 103 to 105, AP containers 106, 107, and DB server 108 are indicated as the monitor objective resource 205. However, since various system resources such as the server computer, network, and storage are included actually, the resources are not limited only to the examples of resources.

FIGS. 13 to 21 illustrate the second embodiment of the present invention. In this second embodiment, the present invention is adapted, as an example, to the database management system (DBMS) and the DBMS storage incorporated application system consisting of two layers of storage, in place of the three-level Web application system of the first embodiment. Here, the operations of the resource allocation system which can automatically conduct the process to change the structure of storage when the vacant capacity of storage reaches a predetermined value or lower will be described below.

Only the DBMS and storage are considered as the monitor objective resources in the second embodiment. Since various system resources such as the server computer, storage device (including SAN and NAS), and network are actually included, the resource is not limited to these resources.

Figure 13:
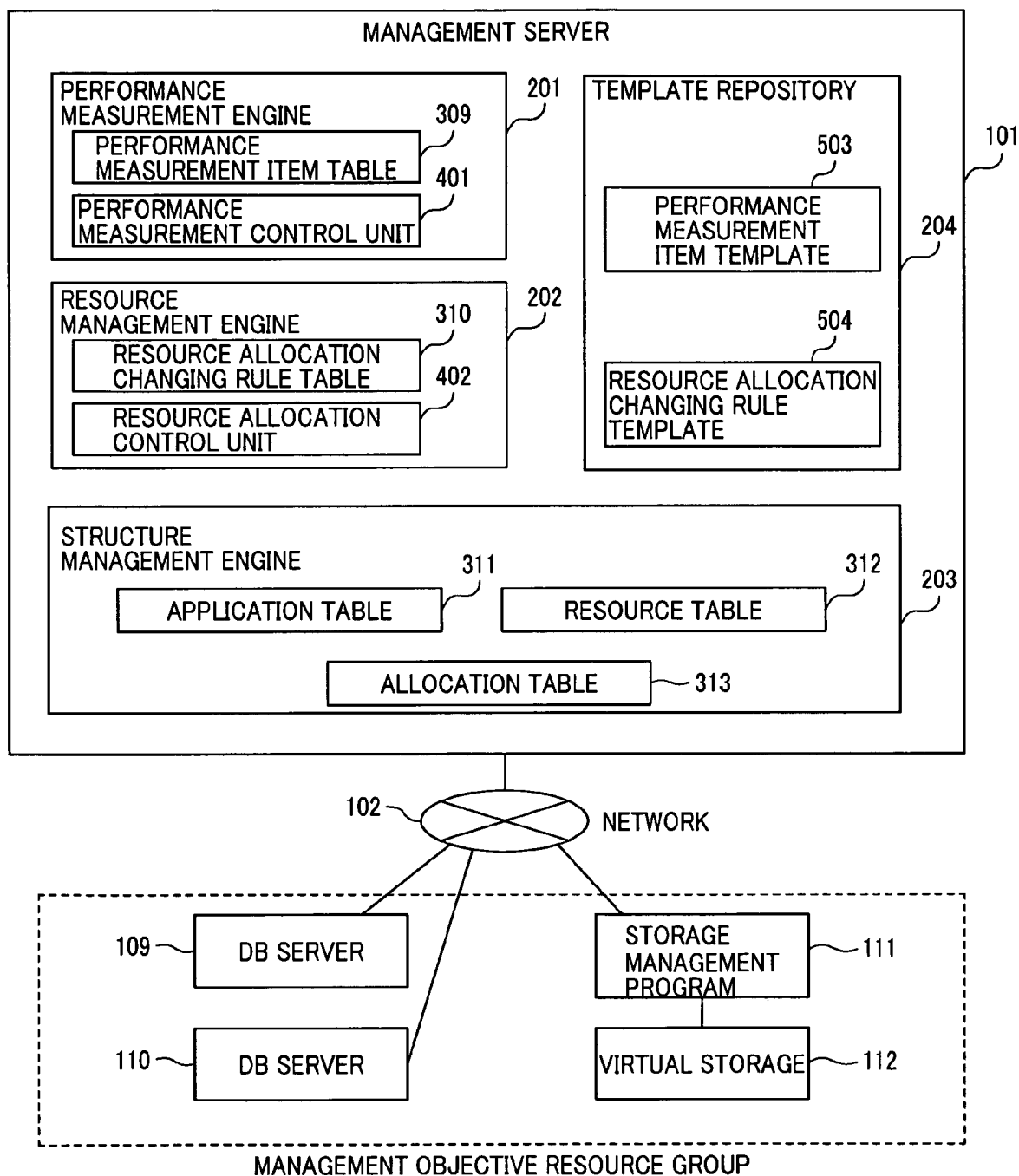
FIG. 13 is a structural diagram illustrating the total structure of the system as a second embodiment of the present invention.

FIG. 13 illustrates a system structure of a computer network.

A management server 101 in FIG. 13 is the server computer in which the resource allocation system is operating as in the case of the first embodiment. On the management server 101, the performance measurement engine 201, resource management engine 202, structure management engine 203, and template repository 204 are operating.

In an example of FIG. 13, each component 201 to 204 is operating on the same management server. However, these components may also be operated on a plurality of management servers. It is also possible to provide a plurality of engines for cooperated operations in the network.

The DB servers 109 to 110 and storage management program 111 are connected to the management server 101 via the network 102. The storage management program 111 provides a virtual storage 112 which is formed as the virtual physical storage for the DB servers 109 to 110. The network connection to realize the DB application function may be identical to the network 102 or may be different from the network. However, in this embodiment, the identical network 102 is used in common. The network 102 may be a small-scale network such as the intra-office local area network or may be a large-scale network such as the Internet.

The performance measurement engine 201 stores, like the first embodiment, the performance measurement item table 309 of FIG. 16 and also includes the performance measurement control unit 401. The performance measurement item table 309 stores a list of the measurement items of the performance information on the management objective system and the performance measurement control unit 401 conducts the performance measurement in accordance with the performance measurement item table 309. The actual performance measurement process may be executed with the performance measurement engine 201 itself or by the other performance measurement program. In this embodiment, the performance measurement engine sends inquires the performance measurement regarding the virtual storage 112 to the storage management program 111.

The resource management engine 202 stores the resource allocation changing rule table 301 illustrated in FIG. 17 and also includes the resource allocation control unit 402. The resource allocation changing rule table 310 stores the resource allocation changing rules for changing the resource allocation in accordance with the result of measurement of the performance information and the resource management control unit 402 executes and processes the relevant rules. In the second embodiment, the allocation changing process regarding the virtual storage 112 is executed by controlling the storage management program 111.

The structure management engine 203 stores three tables of the application table 311, resource table 312 and allocation table 313 including the allocation information between the application and resources of FIGS. 18A to 18C. The application table 311 stores the structure information on the application in the form of the hierarchical structure of structure elements. The resource table 312 stores the relationship among the resource ID of system resources, resource name and attribute thereof (such as storage capacity). The allocation table 313 indicates correspondence between the application and the resources allocated thereto and also stores the resource ID, application ID and allocation rate of resources (allocation coefficient).

Moreover, the template repository 204 stores the performance measurement item template 503 for DBMS storage incorporated application and the resource allocation template 504. Contents of the template repository 204 are indicated in FIG. 14. The template repository 204 is the engine for storing a set of the performance measurement item list (performance measurement item template 503) used in the performance measurement engine 201 and resource management engine 202 and the resource allocation changing rule template information (template 504) and also previously storing a set of templates for each kind of the application. In the second embodiment, use of the DBMS storage incorporated application is assumed, the template for this DBMS storage incorporated application must be stored. This template is generated by an application designer or manager who is trying to operate the applications of novel kinds.

Next, contents of each table in the initial allocation condition will be described.

Figure 15:
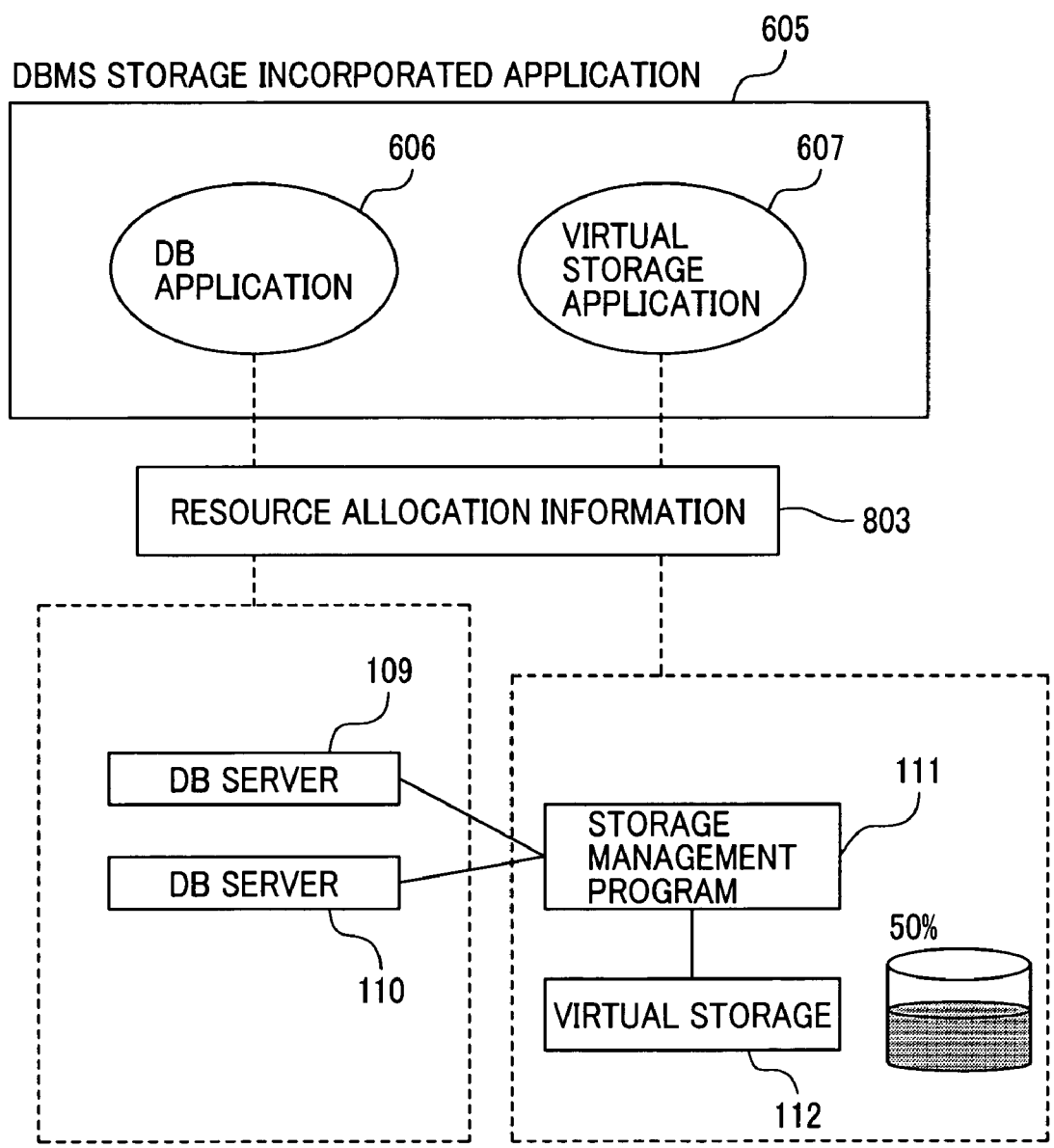
FIG. 15 is an explanatory diagram illustrating the structure information on applications and resources in the initial allocation of the second embodiment.

FIG. 15 is an explanatory diagram illustrating the allocating condition of the resources in the initial condition to the application. The application is hierarchically formed of the DBMS storage incorporated application 605, DB application 606, and virtual storage application 607. This application structure information is included in the application table 311 of FIG. 18A and the application ID, application name and the ID of the application as the parent of such application are included in respective columns of the application table 311. As illustrated in FIG. 15, the DB servers 109 to 110 are allocated to the DB application 606 with the resource allocation information 803, while the virtual storage 112 is allocated to the storage application 607 via the storage management program 111.

All resources provided in the system are described within the resource table 312 of FIG. 18B and the resource table 312 also includes the resource ID and resource name. Contents of the resource allocation information 803 are stored in the allocation table 313 of FIG. 18C and respective columns include the resource ID and application ID in order to indicate the relationship between the allocated resource and application.

In the initial condition, the performance measurement item table 309 of FIG. 16 and the resource allocation changing rule table 310 of FIG. 17 are generated in accordance with the templates 503, 504 of FIG. 14 and the structure information of FIG. 18.

Next, a flow of the process to change the resource allocation based on the performance information will be described in accordance with FIG. 2 of the first embodiment.

First, the performance measurement engine 201 transmits a performance measurement item template request 701 to the template repository 204. As a result, the template repository returns the performance measurement item template 503 to the performance measurement engine with a performance measurement item template response 702. Next, the performance measurement engine 201 transmits a structure information request 703 for obtaining the present structure information to the structure management engine. As a result, the structure management engine 203 returns the requested structure information, namely the application table 311, resource table 312 and allocation table 313 to the performance measurement engine 201 with a structure information response 704. The performance measurement control unit 401 within the performance measurement engine 201 generates a practical performance measurement item table 309 in accordance with the received performance measurement item template 503 and structure information.

Since the performance measurement item corresponding to the structure information on application is described in the performance measurement item template 503, the performance measurement control unit 401 changes the item to the performance measurement item corresponding to the allocated resource. Next, the performance measurement engine 201 transmits a message for instructing measurement of the generated performance measurement item to the performance measurement program operating on the monitor objective resource and receives a result of the performance measurement 706. The performance measurement engine 201 transfers the received performance measurement result 706 to the resource management engine 202. Next, the resource management engine 202 transmits, to the template repository 204, a resource allocation changing rule template request 708 and receives, as a result of transmission, the resource allocation changing rule template 504 with a resource allocation changing rule template response 709. The resource allocation changing rule template 504 previously describes the rules for changing the resource allocation in accordance with the measured performance information and converts respective rules to that corresponding to the practical resource.

Next, the resource management engine 202 transmits a structure information request 710 to the structure management engine 203. As a result, the structure management engine 203 returns the requested structure information, namely the application table 311, resource table 312, and allocation table 313 to the resource management engine 202 with a structure information response 711. The resource allocation control unit 402 within the resource management engine 202 generates the resource allocation changing rule table 310 in accordance with the obtained structure information and the resource allocation changing rule template 504.

Here, in the second embodiment, the vacant capacity of the virtual storage 111 reaches 500 MB as illustrated in FIG. 19, resulting in the assumption that the result of performance measurement lower than 1 GB, which is the threshold value of the resource allocation changing rule template 504, has been obtained. Accordingly, the rule for which the rule ID is defined as 1 among the resource allocation changing rules of FIG. 17 is executed.

Therefore, the resource allocation control unit 402 controls the storage management program 111 as an allocation change 712 for the structure management engine 203 to request the process to add a logical volume size of the virtual storage 112. The structure management engine 203 executes this process. (713)

Figure 20:
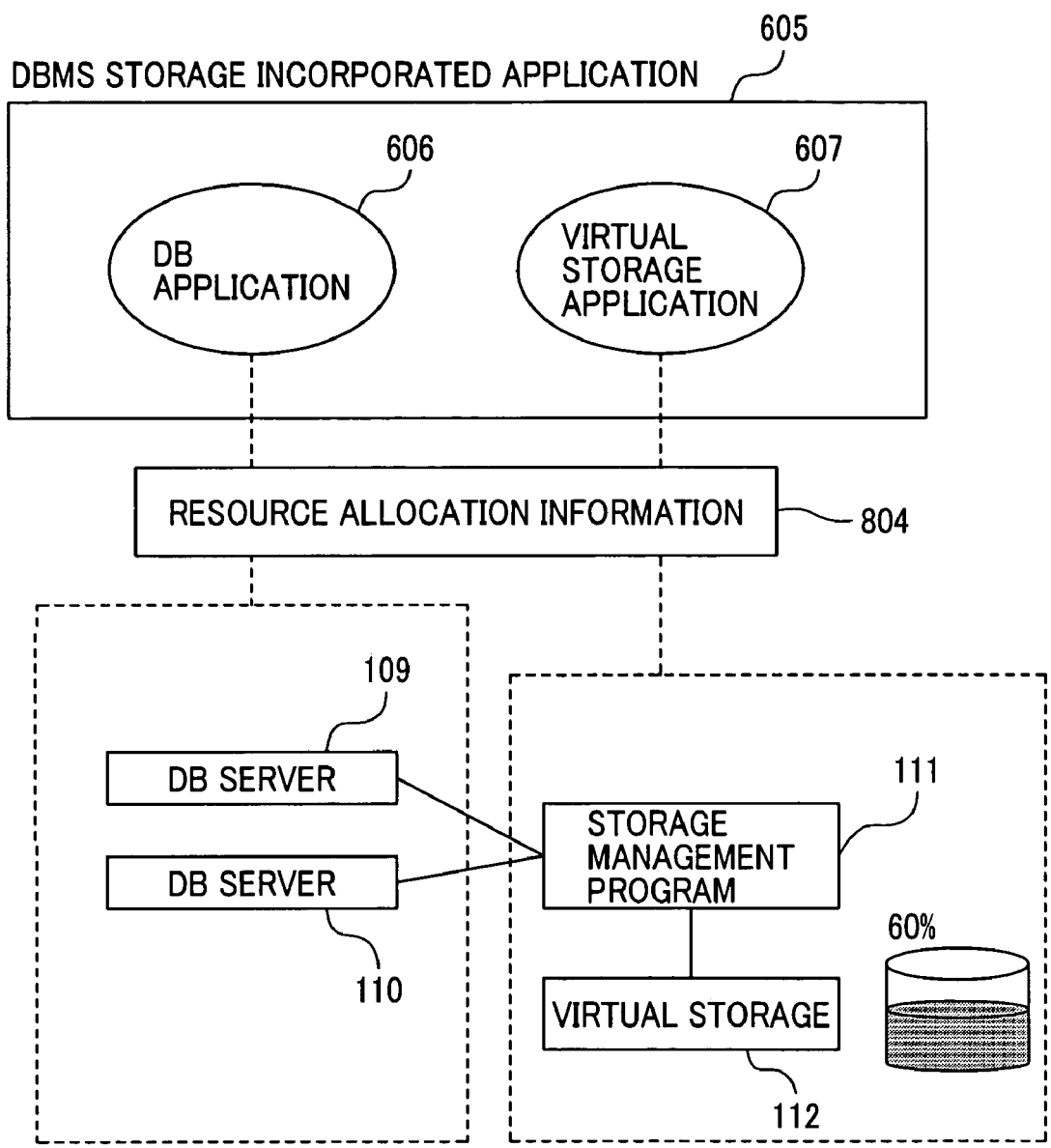
FIG. 20 is an explanatory diagram illustrating the structure information on applications and resources after the change of resource allocation of the second embodiment.

FIG. 20 is an explanatory diagram illustrating the allocating condition of the resources to the application after the change of allocation. Relationship of the logical volume of the virtual storage 112 is newly updated with a resource allocation information 804. The structure information within the structure management engine 203 is changed as illustrated in FIGS. 21A to 21C. The resource allocation information 804 is indicated with the allocation table 314 of FIG. 21C. The final column of the allocation table 314 indicates the part in which the allocation coefficient is changed, suggesting that the storage area of 60% of the virtual storage application 607 in which the application ID is 3 is allocated to the virtual storage 111 in which the resource ID is 3.

With repetition of the sequence described above, a bottleneck of the system is detected in accordance with the contents described in the performance information item template 503 and resource allocation changing rule template 504 to automatically change the resource allocation. Accordingly, the application can always be operated stably while the service level is satisfied.

Figure 22:
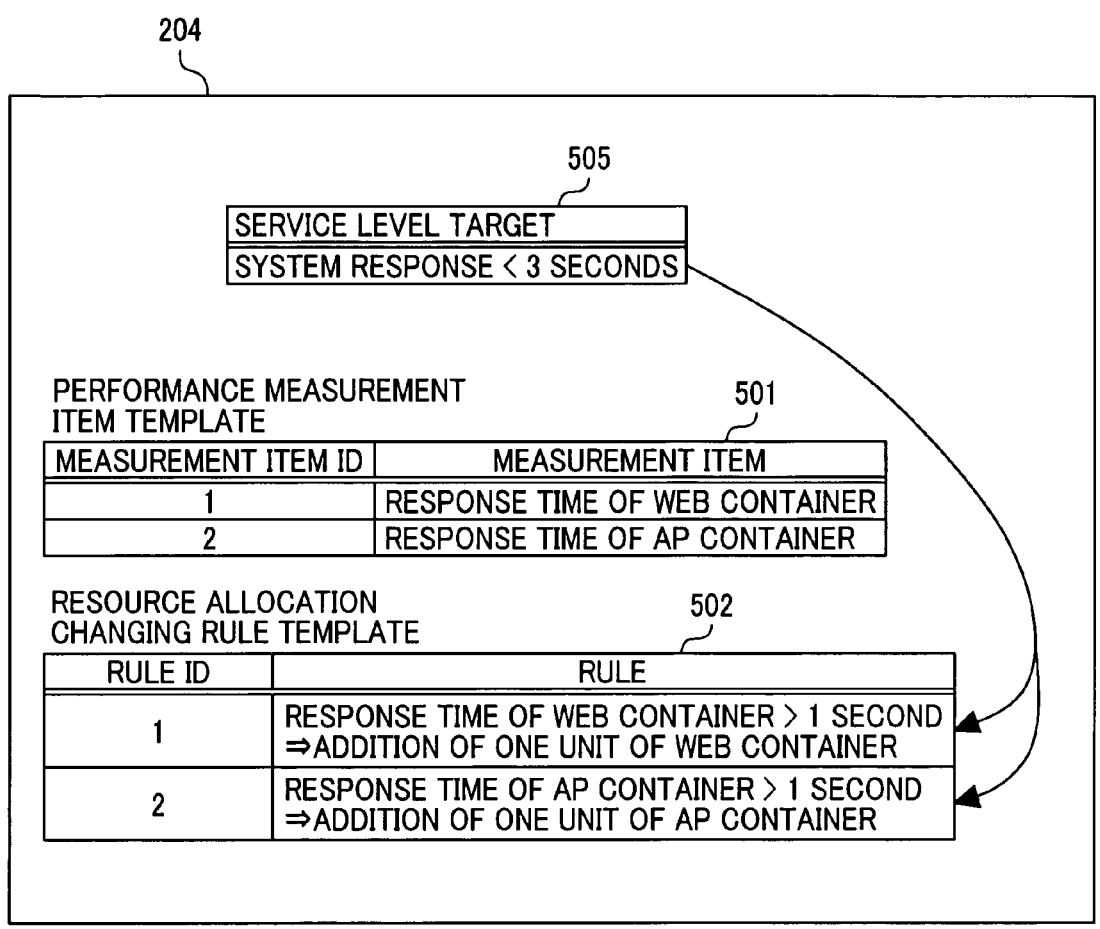
FIG. 22 is an explanatory diagram illustrating contents of a meta template of a template repository, the performance measurement item template, and the resource allocation changing rule template as a third embodiment.

FIG. 22 illustrates the third embodiment, in which the template repository 204 of the first embodiment generates the measurement item and resource allocation changing rule template in order to realize the service level objective having higher degree of abstraction. The other structures are similar to the structures of the first embodiment.

For example, when the total response time of the application system is designated as the service level objective, it must be disassembled to the form of the more practical service level objective. Namely, it is necessary to set the rule to analyze where a bottleneck exists in the system.

Accordingly, a meta template 505 is provided in the three-level Web application 601 of the first embodiment in order to generate a rule corresponding to respective structure elements when the service level objective is set so that a response of the request passing through all paths of the Web container, AP container, and DB server is returned within a constant period.

The rules of the meta template 505 of FIG. 22 is disassembled in accordance with the structure information on the application (for example, allocation table 305 of FIG. 7) and thereby the performance measurement item template 501 and resource allocation changing rule template 502 illustrated, for example, in FIG. 3 can be obtained.

For example, it is assumed that the response time of the system as a whole of the three-level Web application 601 is set to the time less than three seconds as the service level objective in the meta template 505. The template repository 204 shares the service level objective so that the response time of each application becomes less than one second because the application is formed of three applications, judging from the hierarchical structure of the application illustrated in FIG. 7A.

Next, the template repository 204 selects the Web container and AP container as the component (container) for which the resource allocation can be changed from the resource table 304 of FIG. 7B and the allocation table 305 of FIG. 7C. Since only one DB server 108 is provided in this case, change of the resource allocation can be judged to be impossible.

As described above, the measurement item is determined based on the service level objective for the selected resource allocation change objective. Namely, since the service level objective is defined as the response time, the response time is selected as the measurement item and the performance measurement item template 501 in which the Web container is set as the measurement item ID=1 and the AP container is set as the ID=2 can be generated as illustrated in FIG. 22.

Next, with generation of the measurement item ID, the rule is defined so that the rule ID is generated in the resource allocation changing rule template 502, the response time which is less than one second equally allocated to three applications is set as the threshold value of each rule ID, and moreover a kind of container set as the measurement item ID is added as the contents for change of the resource allocation.

Figure 2:
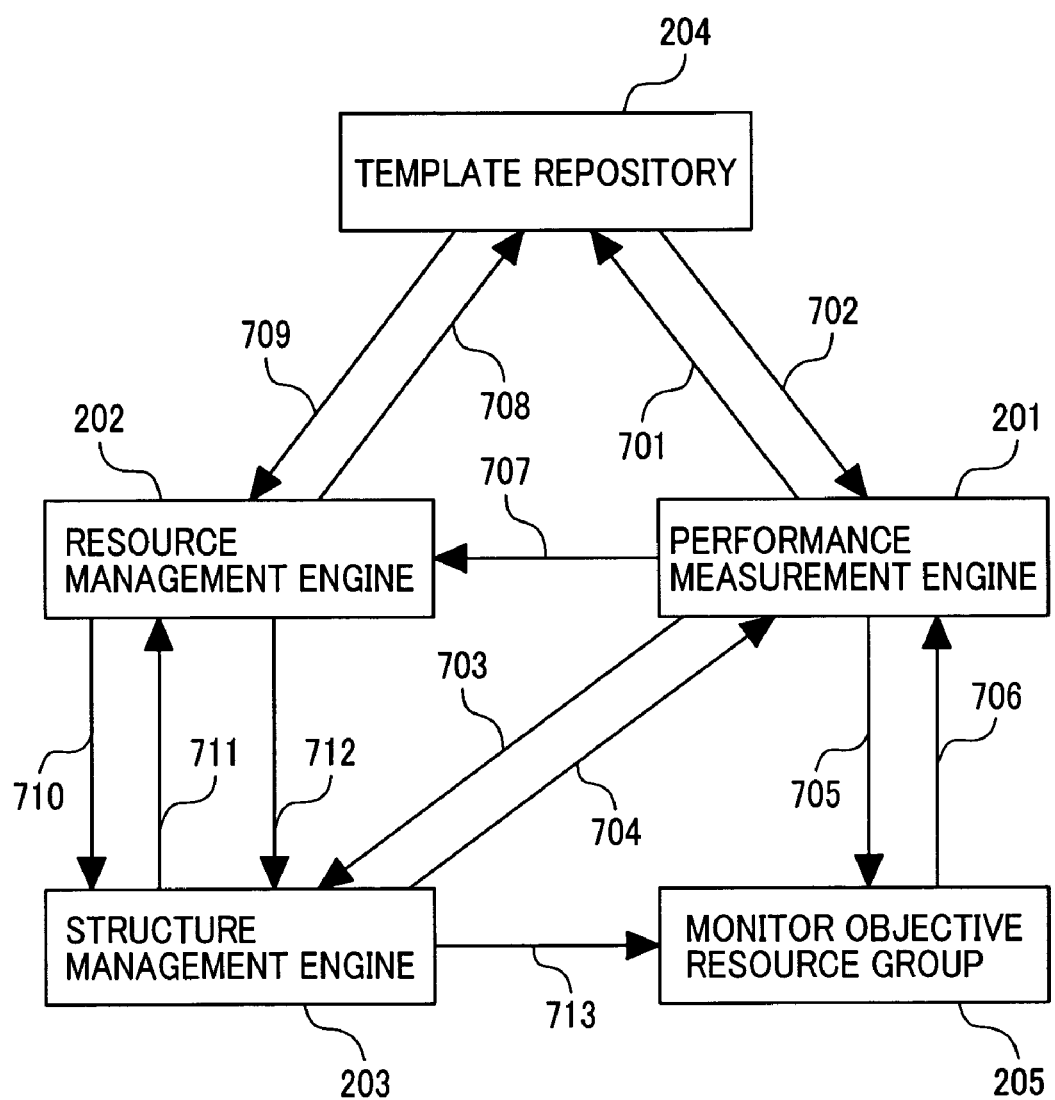
FIG. 2 is a sequence diagram illustrating an example of operation sequence of a resource allocation system.

The resource allocation can be changed based on the measured performance in order to attain the service level objective such as the contents of FIG. 22 by operating the resource allocation system proposed by the present invention in accordance with the flow of FIG. 2 described above using these generated templates.

As described above, the service level objective of higher level can be converted in the form of the practical service level objective corresponding to physical resources and moreover automated high level system management can further be accelerated by analyzing and generating the performance measurement item template 501 and resource allocation changing rule template 502 through extraction of the resource allocation change objective and condition of allocation change in accordance with the structure elements of the resource group of the management objective from the service level objective being set to the meta template 505.

Namely, the flexible frame for the service level objective in the higher level can be provided by introducing a frame structure (meta template 505) for disassembling the service level objective in the higher degree of abstraction to the service level objective in the lower degree of abstraction.

In the third embodiment, the response time is determined to the time less than three seconds as the service level objective and this objective is equally allocated to the response time of the resources (Web container, AP container, and DB server). However, the response time can also be set unequally in accordance with the performance of each resource within the range for attaining the service level objective.

As described above, according to the present invention, the system disclosed therein may be adapted to the resource allocation system and management server of the intra-office system and to the resource allocation system in the data center.

What is claimed is:

1. A resource allocation system for allocating resources including a server, network, and storage, to applications, comprising:

a structure management means for storing: structure information on resources including a server, network, and storage; structure information on applications operating on these resources; allocation information on resources describing a correspondence relation between said applications operating on said resources; and, information describing a correspondence relation between a measurement item of performance information on said resources and said structure information on said applications;

a measurement item generating means for generating a measurement item of performance information on said resources by converting said information describing the correspondence relation between the measurement item and said structure information on said applications, into a measurement item corresponding to resources to which applications currently operating are allocated, using said structure information on resources, and structure information and allocation information on applications;

a performance measurement means for measuring said generated measurement item of performance information; and an allocation changing means for changing the resource allocation information for at least one structure element of said applications based on the result of measurement of said performance information, wherein said measurement item generating means converts a plurality of measurement items which are set previously, based on said information describing the correspondence relation, into said measurement items corresponding to the resources to which applications are allocated.

2. The resource allocation system according to claim 1, wherein said measurement item generating means includes a changing rule generating means for generating a resource allocation changing rule based on said generated measurement item, and said allocation changing means changes the resource allocation based on said generated resource allocation changing rule, said structure information on resources and said structure information on applications, and said allocation information.

3. The resource allocation system according to claim 2, wherein said allocation changing means includes a detail changing rule generating means for generating detail changing rule for each resource from said structure information on applications, said measurement item of performance information, and said resource allocation changing rule.

4. The resource allocation system according to claim 2, wherein said measurement item generating means generates an allocation changing rule of said resources based on a second template which is set previously for each application.

5. The resource allocation system according to claim 2, wherein said measurement item generating means includes a means for storing a service level objective for instructing the performance of said resources as a whole and also generates said measurement item of performance information and said allocation changing rule of resources, based on said service level objective from said structure information indicating the structure elements of applications, said structure information on resources which can be allocated to the structure elements of applications, said measurement item of performance information and said allocation information.

6. The resource allocation system according to claim 1, wherein said measurement item generating means generates the measurement item of said performance information based on the service level objective for instructing the performance of resources as a whole.

7. The resource allocation system according to claim 1, wherein said measurement item comprises any one of a response time, utilization of a CPU included in said resources, and a free capacity of said storage.

8. A resource allocation method for allocating resources including a server, network, and storage to applications, comprising the steps of:
obtaining structure information on the resources including a server, network, and storage, including: structure information on applications operating on said resource; allocation information describing a correspondence relation between said applications operating on said resources and said resources; and information describing a correspondence relation between a measurement item of performance information on said resources and said structure information on applications;
generating a measurement item of performance information on said resources, using said structure information on resources, said structure information on applications, and said allocation information, by converting said information describing a correspondence relation between said measurement item and said structure information on applications, into a measurement item corresponding to resources to which applications currently operating are allocated;
measuring said measurement item of performance information; and
changing said resource allocation information for at least one structural element of said applications based on a result of measurement of said performance information,
wherein the step of generating a measurement item comprises converting said plurality of measurement items which are set previously, based on said information describing a correspondence relation, into said measurement item corresponding to said resources to which applications currently operating are allocated.

9. The resource allocation method according to claim 8, comprising a step of generating resource allocation changing rules based on said generated measurement item in order to change resource allocation based on said generated resource allocation changing rules, said structure information on resources, said structure information on applications, and said allocation information.

10. The resource allocation method according to claim 9, comprising a step of generating a detail changing rule of each resource from said structure information on applications, said measurement item of performance information, and said resource allocation changing rule in order to change said resource allocation based on said detail changing rule.

11. The resource allocation method according to claim 9, comprising a step of generating said allocation changing rule of resources based on a second template preset for each application.

12. The resource allocation method according to claim 9, comprising a step of setting a service level objective for instructing the performance of resources as a whole in order to generate said measurement item of performance information and said resource allocation changing rule in accordance with said service level objective from said structure information indicating the structural elements of said applications, said structure information on resources which can be allocated to the structural elements of applications, and said allocation information.

13. The resource allocation method according to claim 8, wherein, in said step of generating said measurement item of performance information, said measurement item of performance information is generated based on the service level objective for instructing the performance of resources as a whole.

14. The resource allocation method according to claim 8, wherein said measurement item comprises any one of a response time, utilization of a CPU included in said resources, and a free capacity of said storage.

15. A storage storing a program executing by a processor for allocating resources including a server, network, and storage to applications, said program comprising:
means for obtaining: structure information on resources including a server, network, and storage; structure information on applications operating on these resources; allocation information describing a correspondence relation between said applications operating on said resources and said resources; and information describing a correspondence relation between a measurement item of performance information on said resources and said structure information on applications;
means for generating a measurement item of performance information on said resources, using said structure information on resources, said structure information on applications, and said allocation information, by converting said information describing a correspondence relation between said measurement item and said structure information on applications into a measurement item corresponding to resources to which applications currently operating are allocated;
means for measuring said generated measurement item of performance information; and
means for changing said allocation information on resources for each structural element of said applications based on a result of measurement of said performance information,
wherein said means for generating a measurement item comprises converting a plurality of measurement items which are set previously, based on said information describing a correspondence relation, into said measurement item corresponding to said resources to which applications currently operating are allocated.

16. The storage storing a program according to claim 15, wherein said program further comprising a means for generating allocation changing rules of resources based on said generated measurement item in order to change the allocation of resources based on said allocation changing rules of generated resources, said structure information on resources, said structure information on applications, and said allocation information.

17. The storage storing said program according to claim 15, wherein said means for generating a measurement item generates said measurement item of performance information based on the service level objective for instructing the performance of resources as a whole.

18. The storage storing said program according to claim 15, wherein said measurement item comprises any one of a response time, utilization of a CPU included in said resources, and a free capacity of said storage.

19. A resource allocation system for allocating resources including a server, network, and storage, to applications serving as structural elements of a task system, comprising:
- a structure management means for storing: structure information on resources including a server, network, and storage; structure information on a task system indicating a configuration of said applications forming said task system operating on these resources; and allocation information describing a correspondence relation between said applications forming said task system operating on said resources and said resources;
- means for generating a measurement item of performance information on said resources using said structure information on resources, said structure information on applications, and said allocation information, by converting said information describing a correspondence relation between said measurement item and said structure information on applications into a measurement item corresponding to resources to which applications currently operating are allocated;
- a performance measurement means for measuring said generated measurement item of performance information;
- an allocation changing means for changing said resource allocation information for at least one structure element of said task system based on a result of measurement of said performance information,
- wherein said measurement item generating means converts a plurality of measurement items which are set previously, based on said information describing a correspondence relation, into measurement items corresponding to said resources to which said applications forming said task system are allocated.

20. The resource allocation system according to claim 19, wherein said task system comprises a web container, an application container, and a database.

21. The resource allocation system according to claim 19, wherein said task system comprises a database management system and a storage system.

22. The resource allocation system according to claim 19, wherein said measurement item generating means converts a response time of resources to which said applications forming said task system experience, into a measurement item.

23. The resource allocation system according to claim 19, wherein:
- said measurement item generating means generates again, after said allocation changing means changes said resource allocation information for at least one structural element of said task system, a measurement item of performance information on said resources; and
- said performance measurement means measures said generated measurement item of performance information.

24. A resource allocation method for allocating resources including a server, network, and storage, to applications, which are structural elements of a task system, the resource allocation method comprising the steps of:
- obtaining: structure information on resources including a server, network, and storage; structure information on a task system indicating a configuration of applications forming said task system operating on said resources; resource allocation information describing a correspondence relation between said applications forming said task system operating on said resources and said resources; and information describing a correspondence relation between a measurement item of performance information on said resources and said structure information on the task system;
- generating said measurement item of performance information on said resources, using said structure information on resources, said structure information on the task system, and said allocation information, by converting said information describing a correspondence relation between said measurement item and said structure information on the task system, into a measurement item corresponding to resources to which applications currently operating are allocated;
- measuring said generated measurement item of performance information; and
- changing said resource allocation information for each structural element of said task system based on a result of measurement of said performance information,
- wherein said step of generating a measurement item comprises converting a plurality of measurement items which are set previously, based on said information describing a correspondence relation, into said measurement item corresponding to resources to which applications forming said task system are allocated.

25. The resource allocation method according to claim 24, wherein said task system comprises a web container, an application container, and a database.

26. The resource allocation method according to claim 24, wherein said task system comprises a database management system and a storage system.

27. The resource allocation method according to claim 24, wherein said step of generating a measurement item comprises converting a response time of said resources to which an application forming said task system is allocated into a measurement item.

28. The resource allocation method according to claim 24, wherein:
- said step of generating a measurement item comprises generating, after said resource allocation information is changed for at least one structural element of said task system by said step of changing, a measurement item of performance information on said resources; and
- said step of measuring comprises measuring again said generated measurement item of performance information.

29. A medium storing a program for allocating resources including a server, network, and storage to applications serving as structural elements of a task system, comprising means for:
- obtaining: structure information on resources including a server, network, and storage; structure information on task system indicating a configuration of said applications forming task system operating on said resources; allocation information describing a correspondence relation between said applications forming said task system operating on said resource and said resources, and information describing a correspondence relation between a measurement item of performance information on said resources and said structure information on the task system;
- generating a measurement item of performance information on said resources, by converting, using said structure information on resources, said structure information on task system, and said allocation information, said information describing a correspondence relation between said measurement item and said structure information on task system into a measurement item corresponding to resources to which applications currently operating are allocated;

measuring said generated measurement item of performance information; and changing said allocation information on resources for each structural element of said task system based on a result of measurement of said performance information, wherein said means for generating a measurement item comprises converting a plurality of measurement items which are set previously, based on said information describing a correspondence relation, into said measurement item corresponding to resources to which said applications forming said task system are allocated.

30. The medium storing said program according to claim 29, wherein said task system comprises a web container, an application container, and a database.

31. The medium storing said program according to claim 29, wherein said task system comprises a database management system and a storage system.

32. The medium storing said program according to claim 29, wherein said means for generating a measurement item converts a response time of resources to which said applications forming said task system are allocated into a measurement item.

33. The medium storing said resource allocation program according to claim 29, wherein:

said means for generating a measurement item generates again, after said means for changing changes said resource allocation information for at least one structural element on said task system, a measurement item of said performance information on said resources; and said means for measuring a measurement item measures again said generated measurement item of performance information.

\* \* \* \* \*